United States Patent
Backensto et al.

(10) Patent No.: US 10,394,621 B1
(45) Date of Patent: Aug. 27, 2019

(54) METHOD AND COMPUTER READABLE MEDIUM FOR PROVIDING CHECKPOINTING TO WINDOWS APPLICATION GROUPS

(71) Applicant: OPEN INVENTION NETWORK LLC, Durham, NC (US)

(72) Inventors: Keith Richard Backensto, San Jose, CA (US); Allan Havemose, Arroyo Grande, CA (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 78 days.

(21) Appl. No.: 15/402,612

(22) Filed: Jan. 10, 2017

Related U.S. Application Data

(63) Continuation of application No. 14/952,286, filed on Nov. 25, 2015, now Pat. No. 9,547,561, which is a continuation of application No. 14/532,336, filed on Nov. 4, 2014, now Pat. No. 9,201,737, which is a continuation of application No. 13/630,282, filed on Sep. 28, 2012, now Pat. No. 8,881,171, which is a continuation of application No. 12/334,666, filed on Dec. 15, 2008, now Pat. No. 8,281,317.

(51) Int. Cl.
*G06F 9/52* (2006.01)

(52) U.S. Cl.
CPC .............. *G06F 9/526* (2013.01); *G06F 9/522* (2013.01)

(58) Field of Classification Search
None
See application file for complete search history.

(56) References Cited

U.S. PATENT DOCUMENTS

| | | | | |
|---|---|---|---|---|
| 6,560,626 B1* | 5/2003 | Hogle | ................... | G06F 9/4812 718/102 |
| 6,859,928 B2* | 2/2005 | Wright | .................... | G06F 3/038 709/203 |
| 7,197,700 B2* | 3/2007 | Honda | ................ | G06F 9/45512 715/207 |
| 7,293,200 B2* | 11/2007 | Neary | ................. | G06F 11/1482 714/11 |
| 2002/0165977 A1* | 11/2002 | Novaes | ..................... | G06F 8/61 709/237 |

(Continued)

*Primary Examiner* — Chat C Do
*Assistant Examiner* — William C Wood

(57) ABSTRACT

A computer readable medium and method for providing checkpointing to Windows application groups. The checkpointing may be triggered asynchronously using Asynchronous Procedure Calls. The computer readable medium includes computer-executable instructions for execution by a processing system. The computer-executable instructions may be for reviewing one or more command line arguments to determine whether to start at least one of the application groups, and when determining to start the at least one of the application groups, creating a process table in a shared memory to store information about each process of the at least one of the application groups. Further, the instructions may be for registering with a kernel module to create an application group barrier, creating a named pipe for applications of the application group to register and unregister, triggering a checkpoint thread to initiate an application group checkpoint; and launching an initial application of the applications of the application group.

20 Claims, 12 Drawing Sheets

(56) References Cited

U.S. PATENT DOCUMENTS

| | | | |
|---|---|---|---|
| 2005/0262411 A1* | 11/2005 | Vertes | G06F 11/203 714/741 |
| 2005/0268273 A1* | 12/2005 | Fresko | G06F 8/458 717/100 |
| 2007/0174541 A1* | 7/2007 | Chandrasekaran | G06F 12/0817 711/100 |
| 2007/0277056 A1* | 11/2007 | Varadarajan | G06F 11/1438 714/15 |
| 2009/0013323 A1* | 1/2009 | May | G06F 9/30087 718/104 |

* cited by examiner

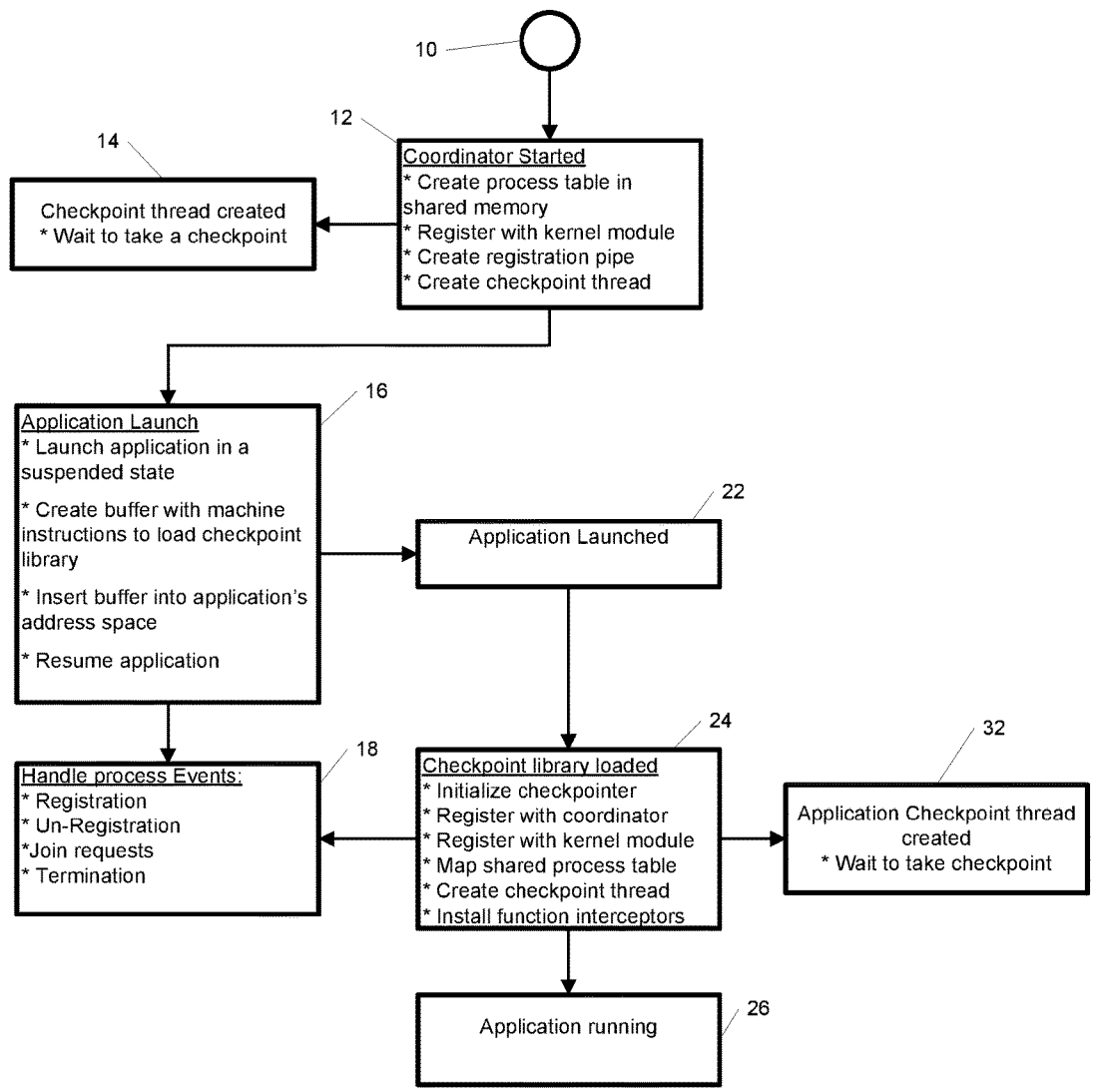
FIG. 1 – Launching an application

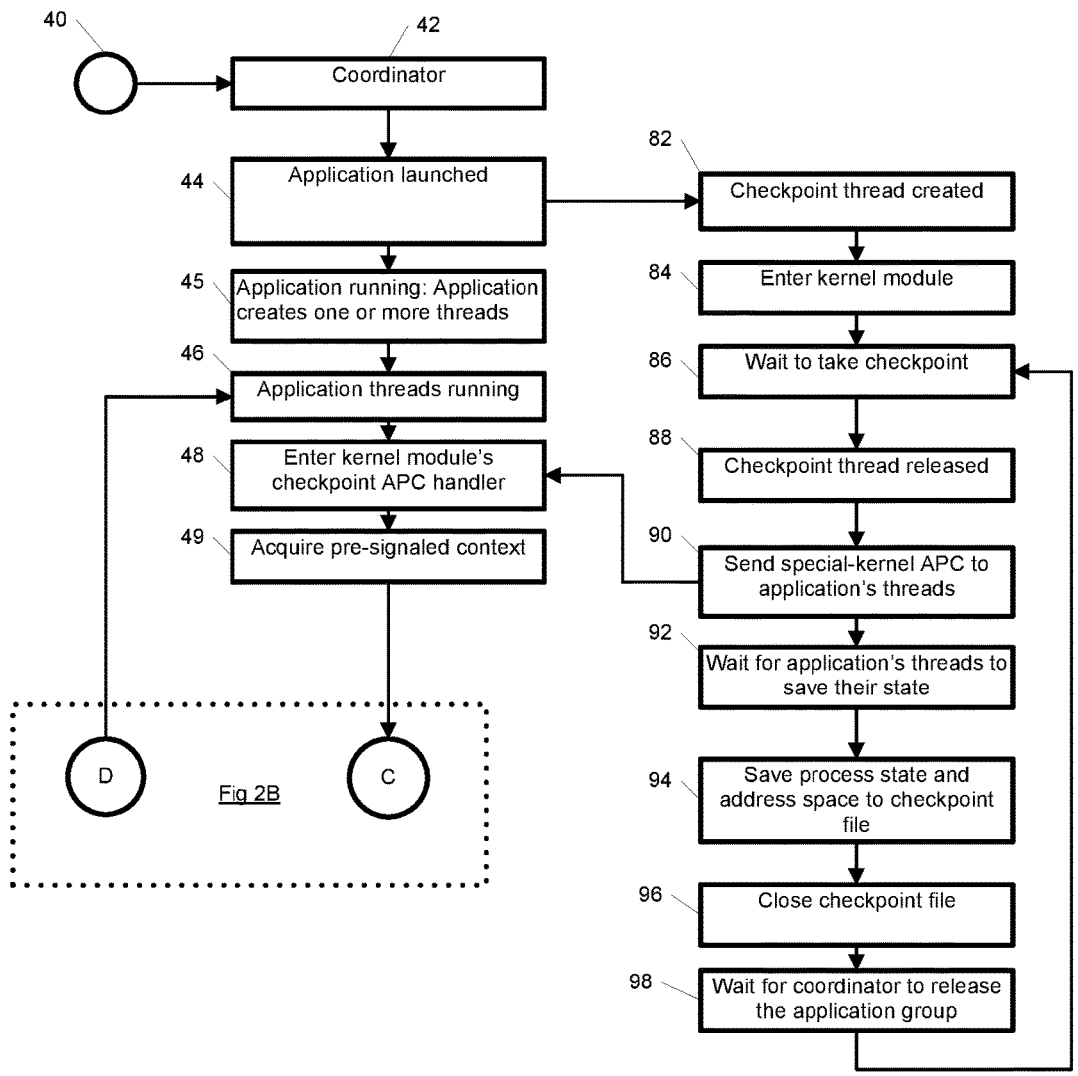
Fig. 2A – Taking an application process' checkpoint

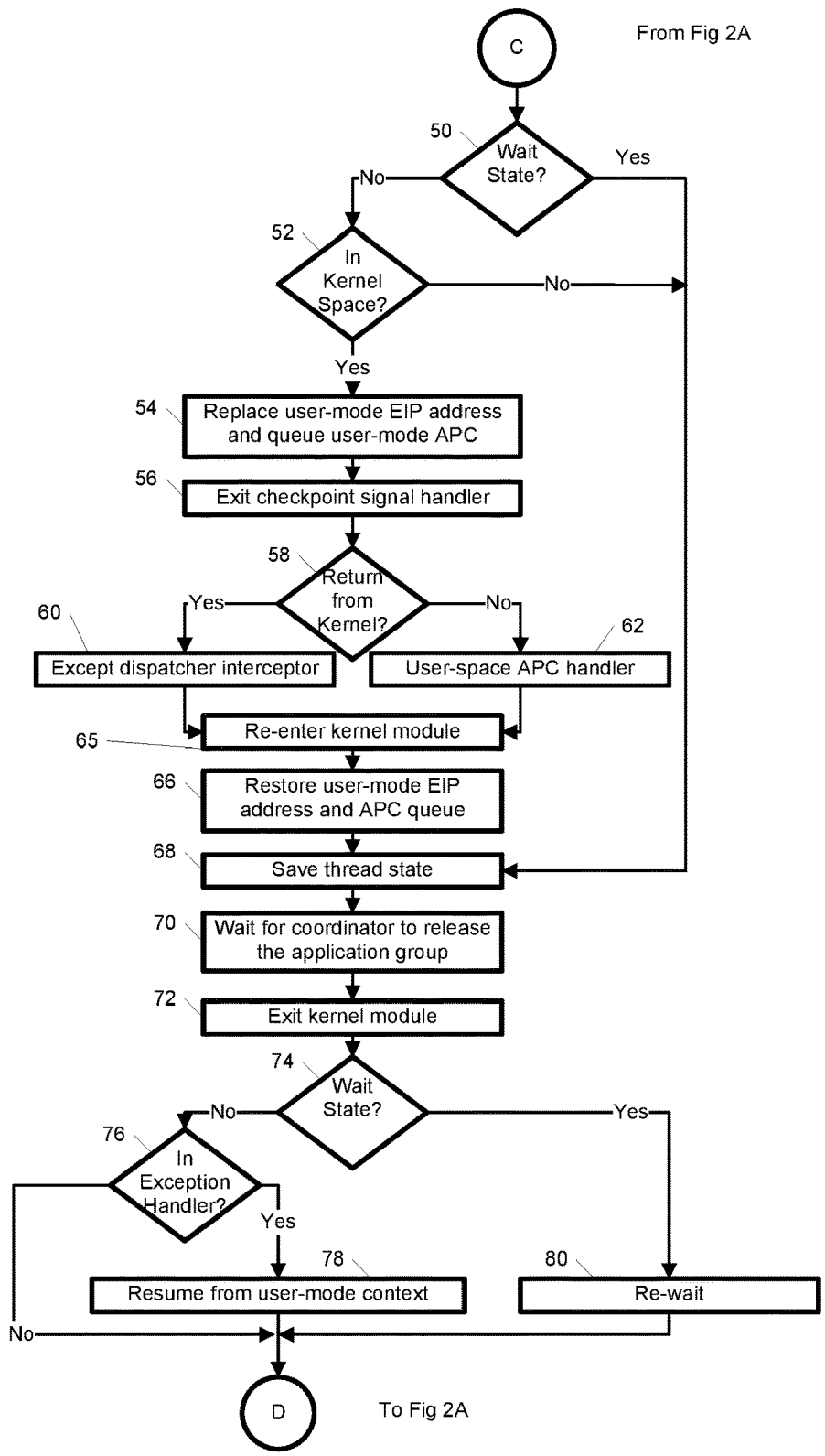
Fig. 2B – Taking an application process' checkpoint

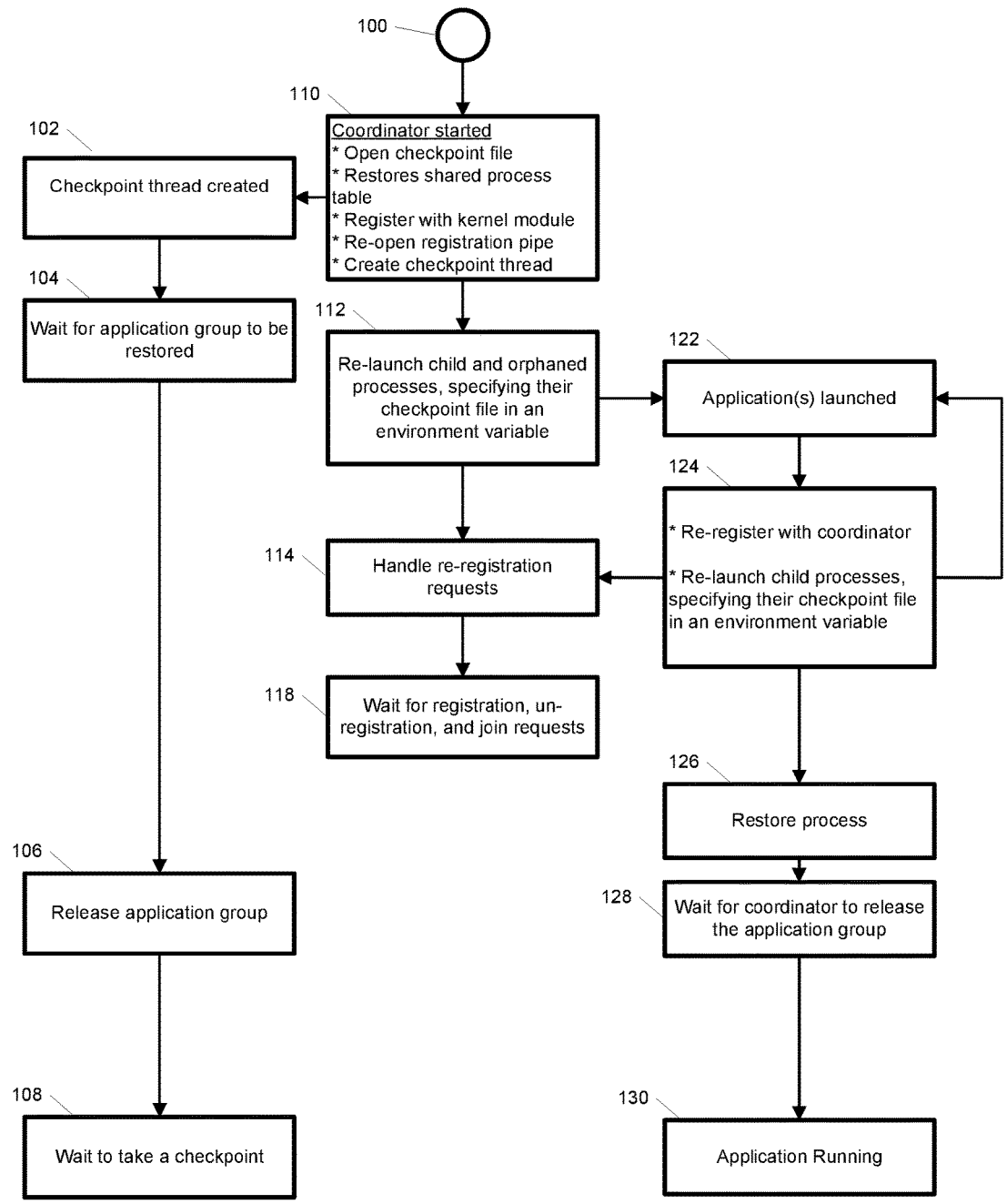
Fig 3 Restoring an Application Group

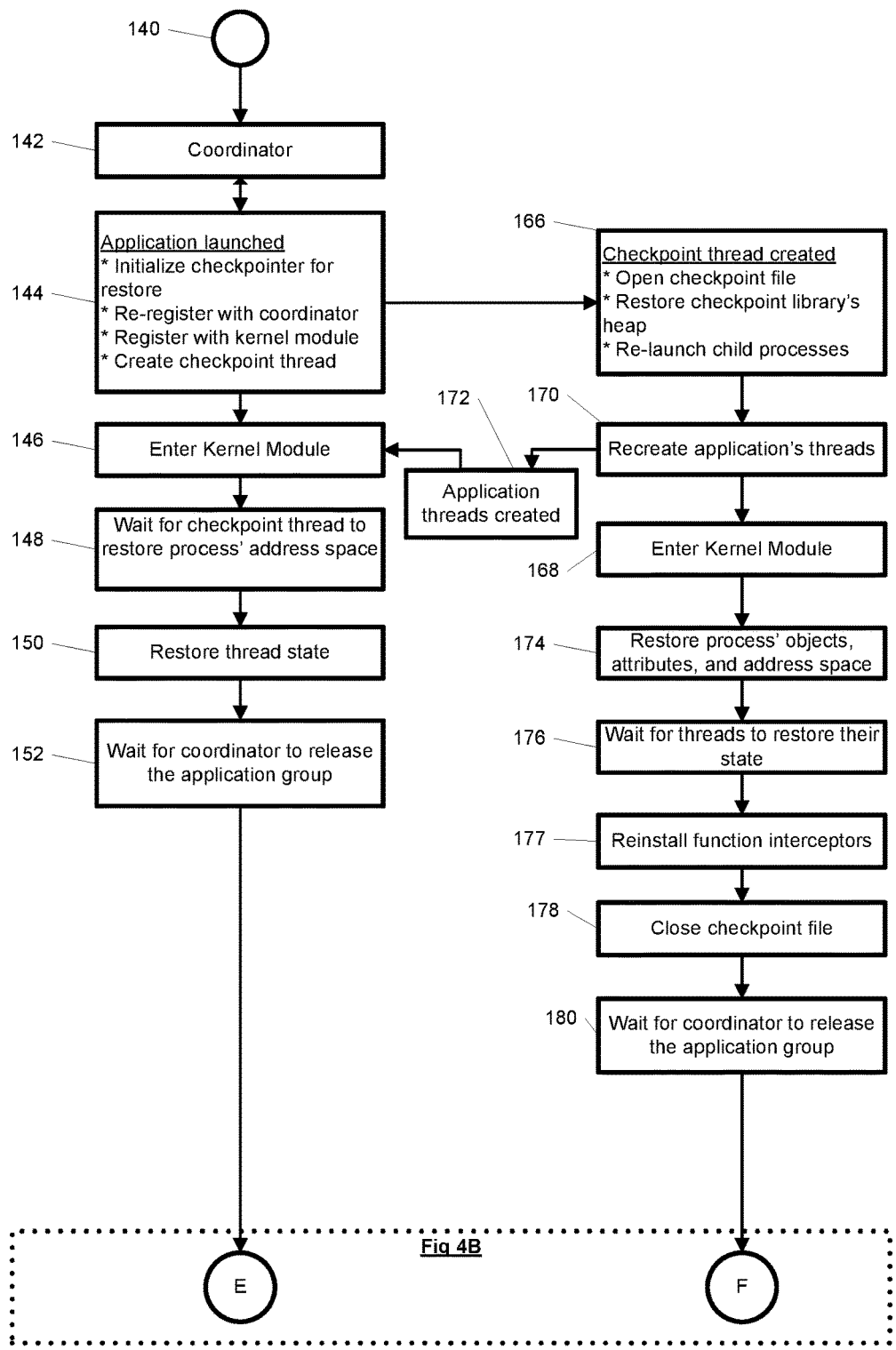
Fig 4A Restoring an Application Process from a checkpoint

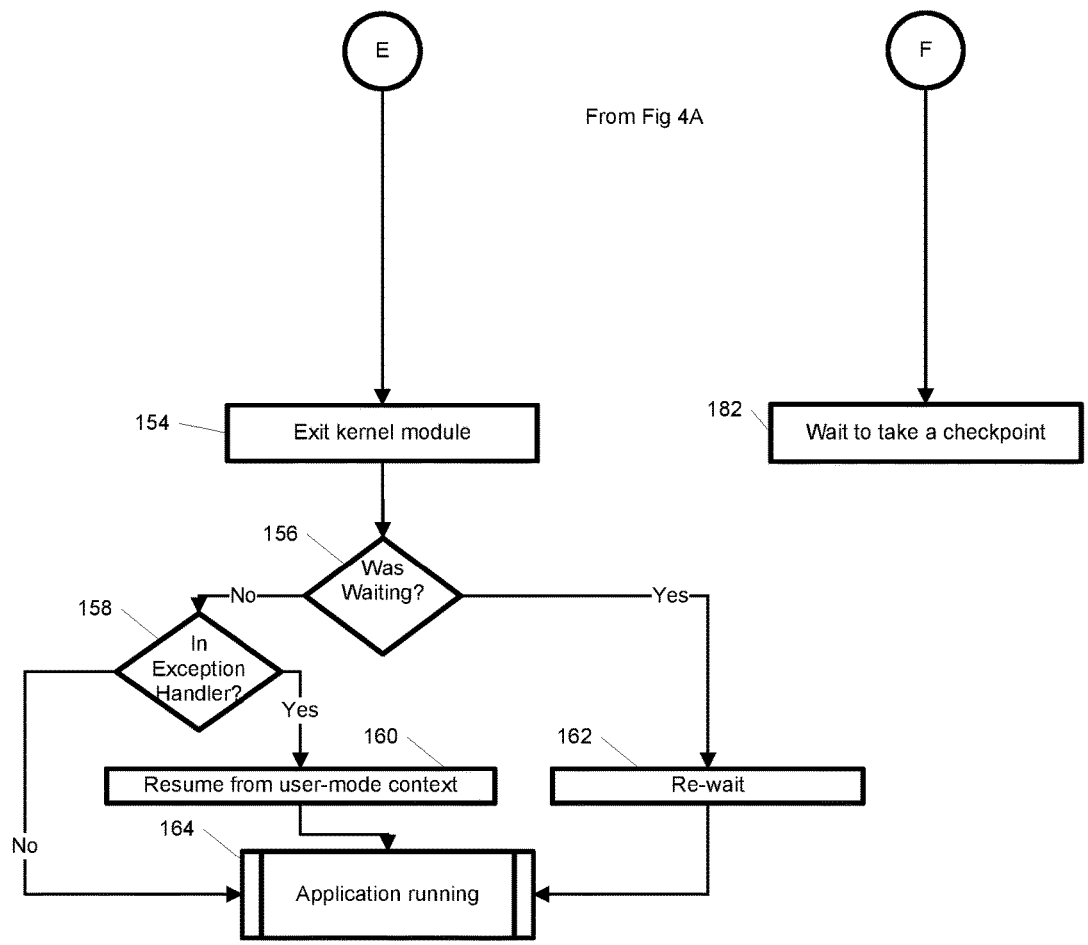
Fig 4B Restoring an Application Process from a checkpoint

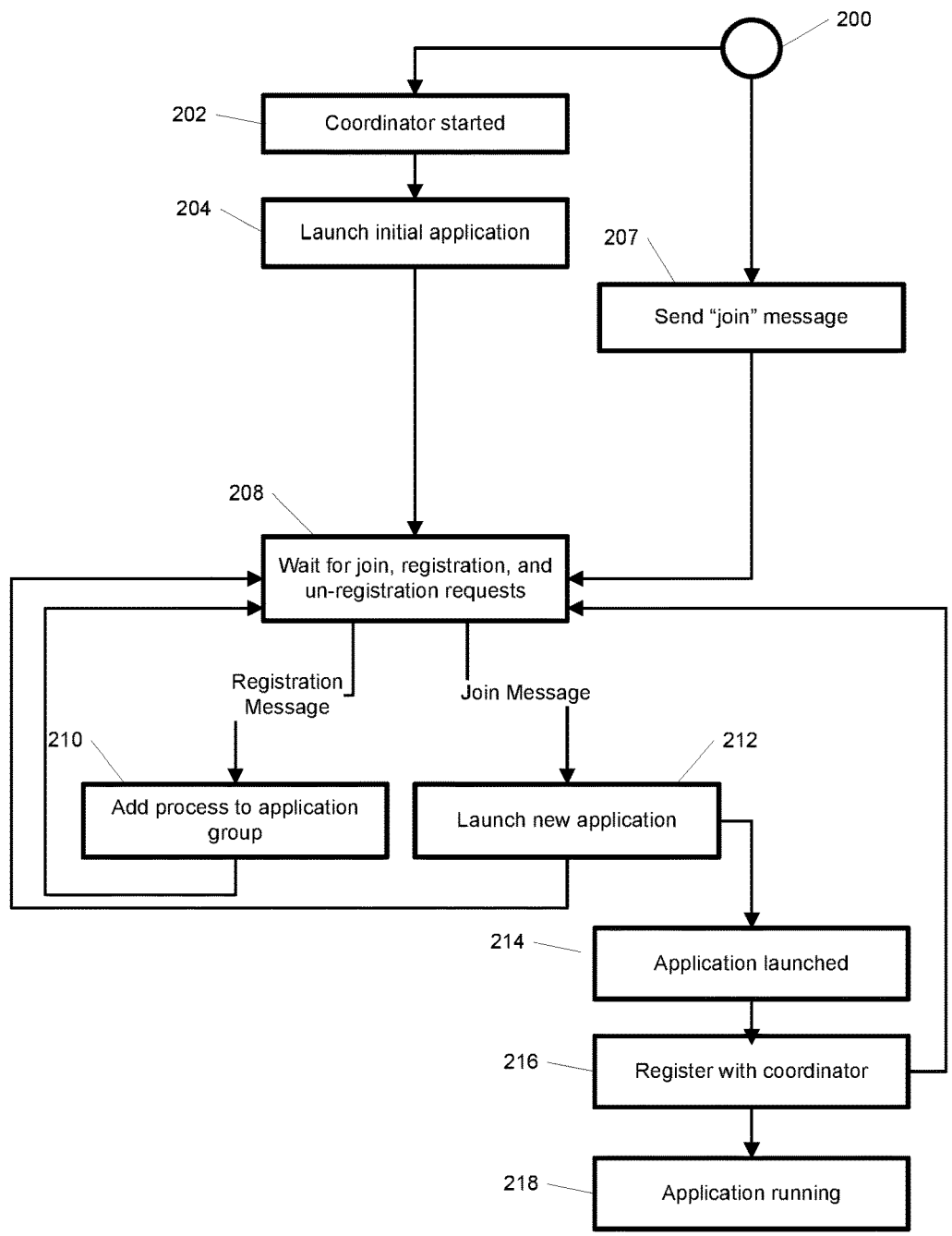
Fig 5 Adding an independent application to an application group

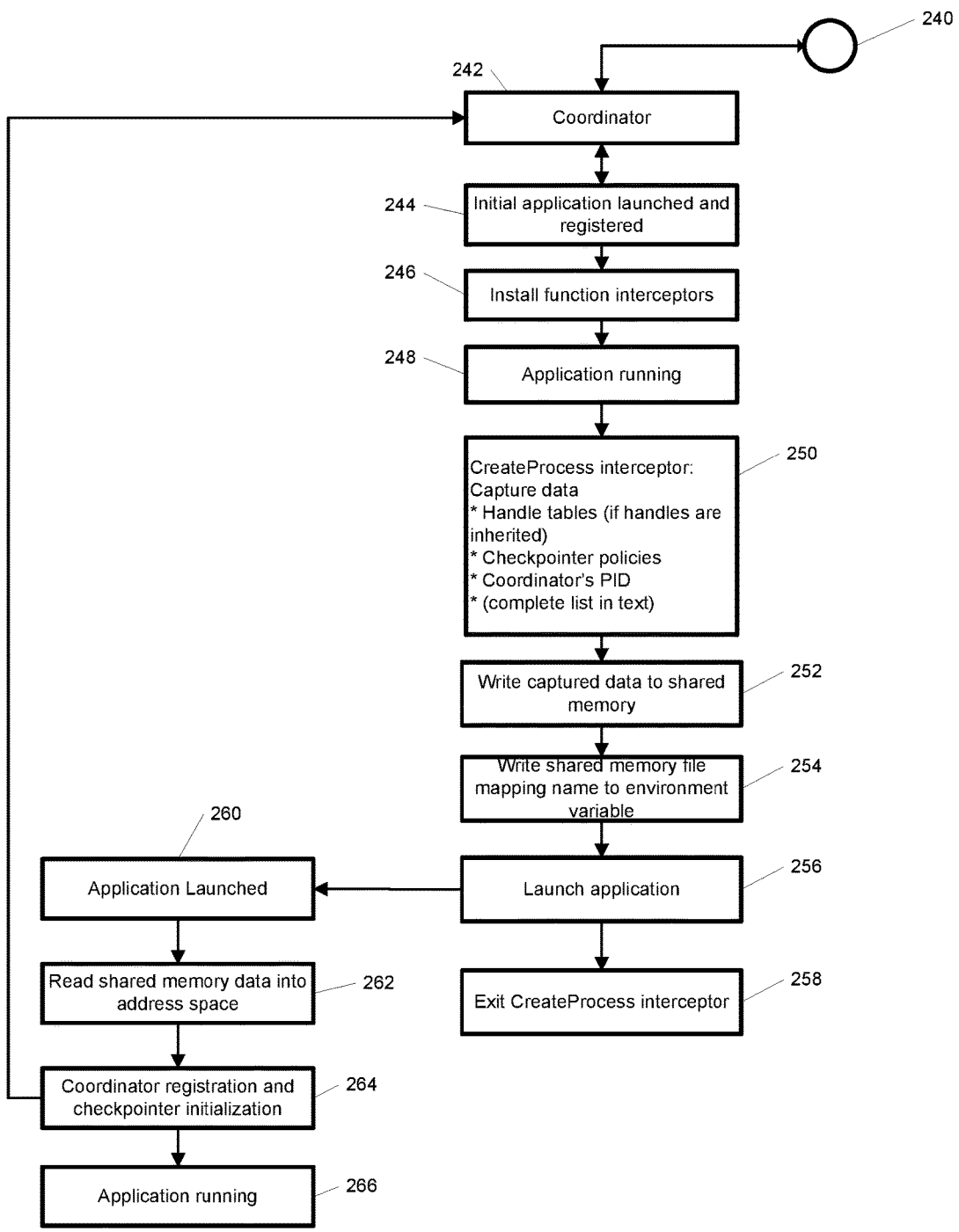
Fig 6. Adding an application launched by a process within an application group

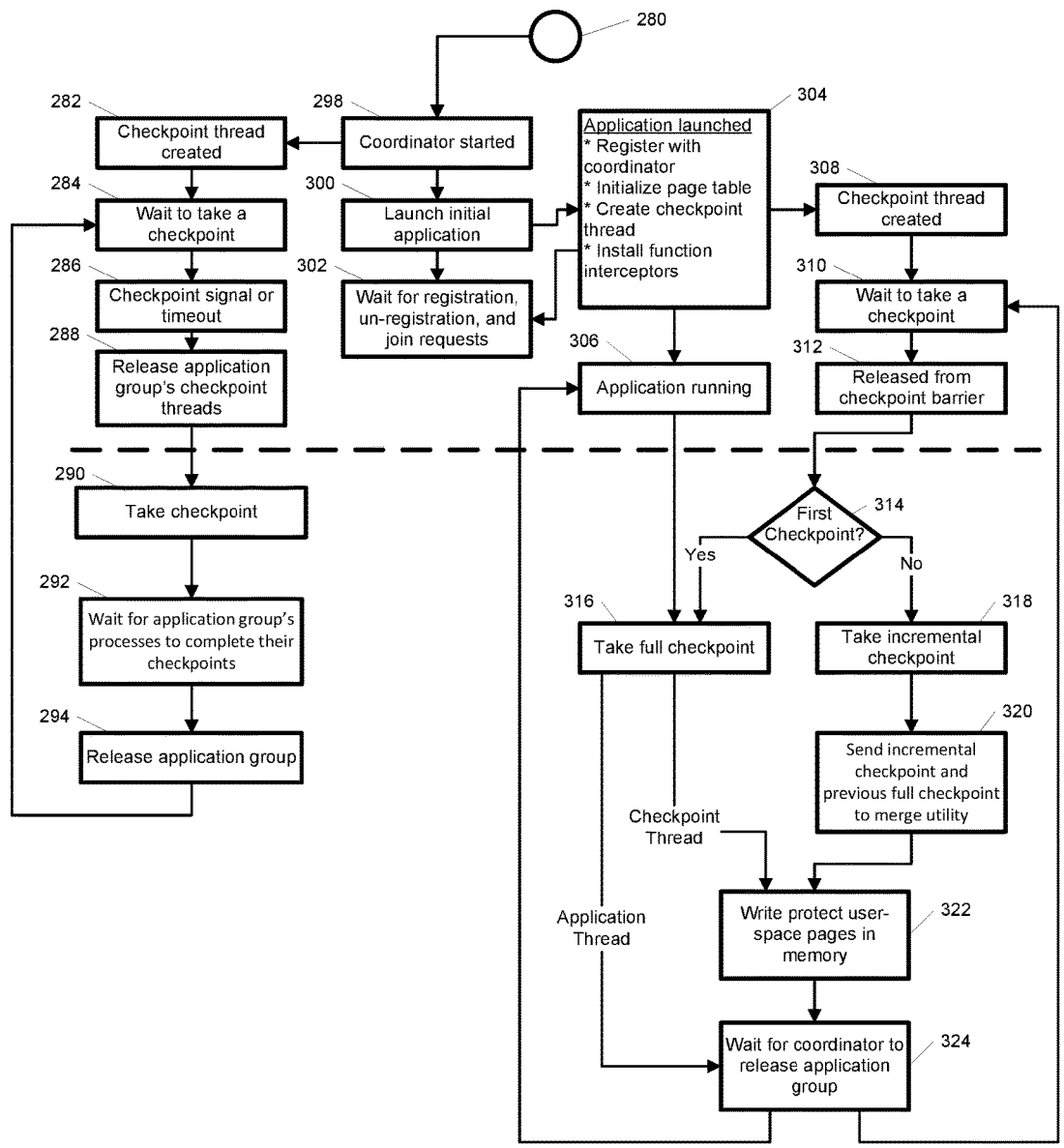
Fig. 7 – Taking full and incremental application group checkpoints

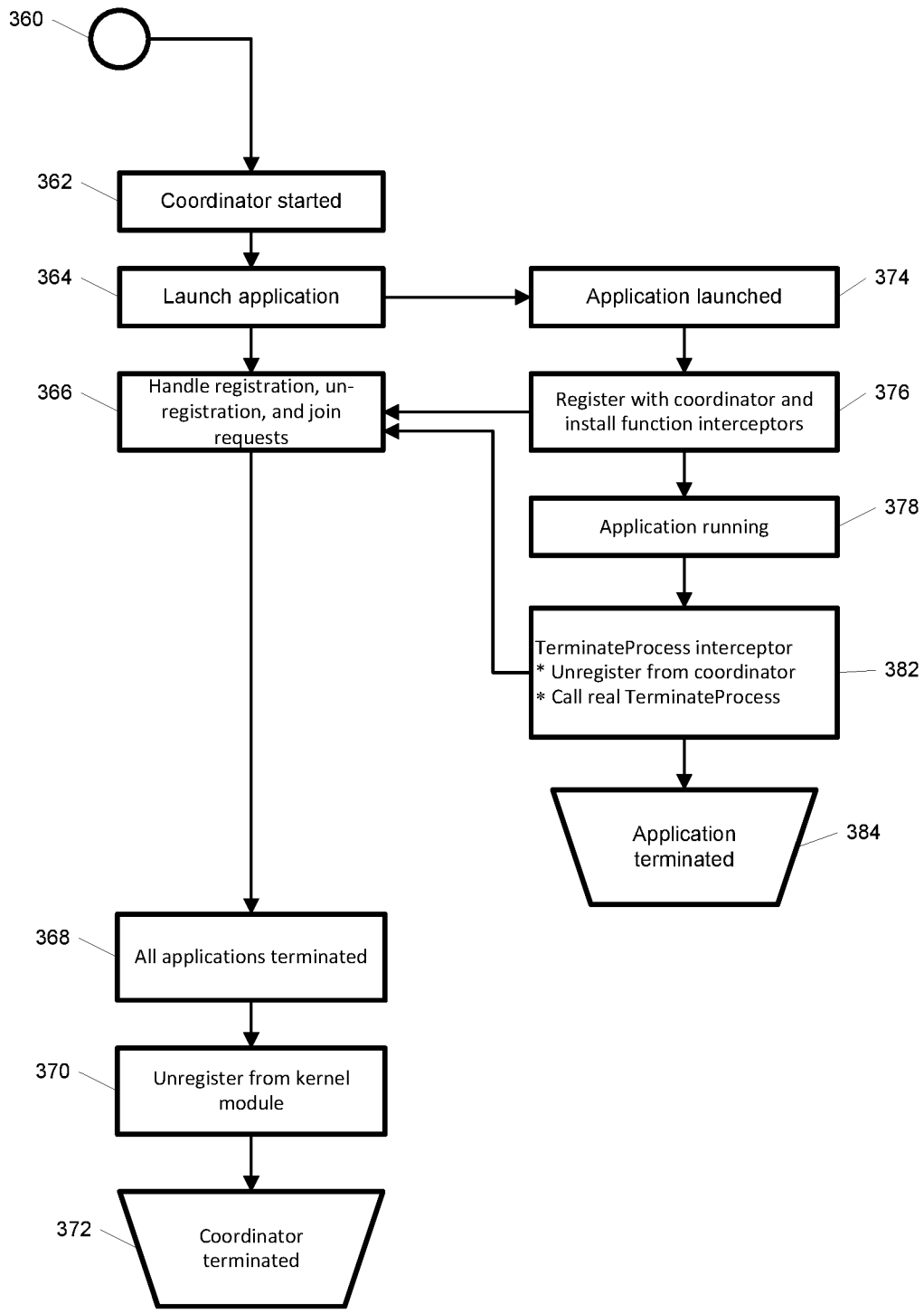
Fig 8. Removing an application from its application group

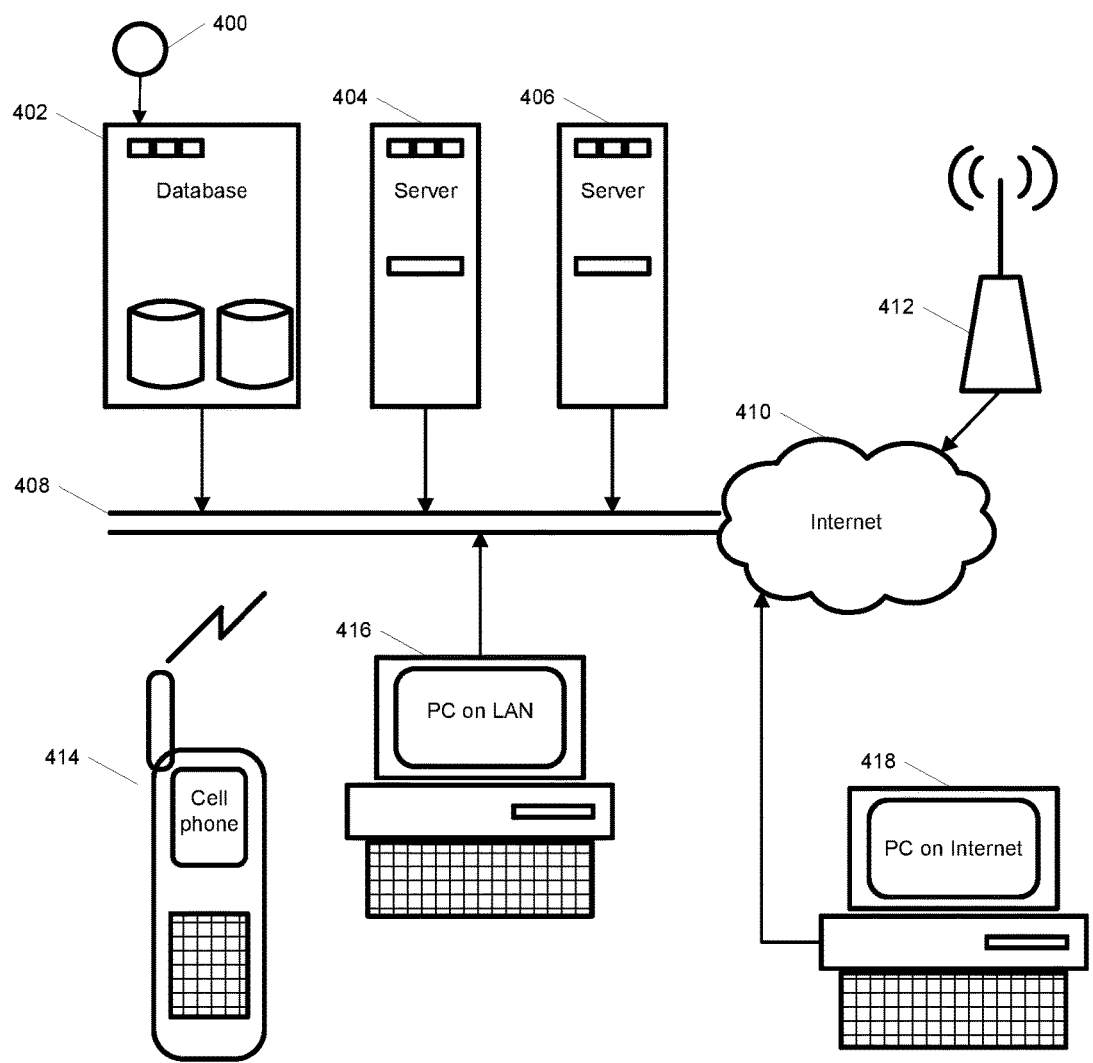
Fig.9 – Deployment scenarios

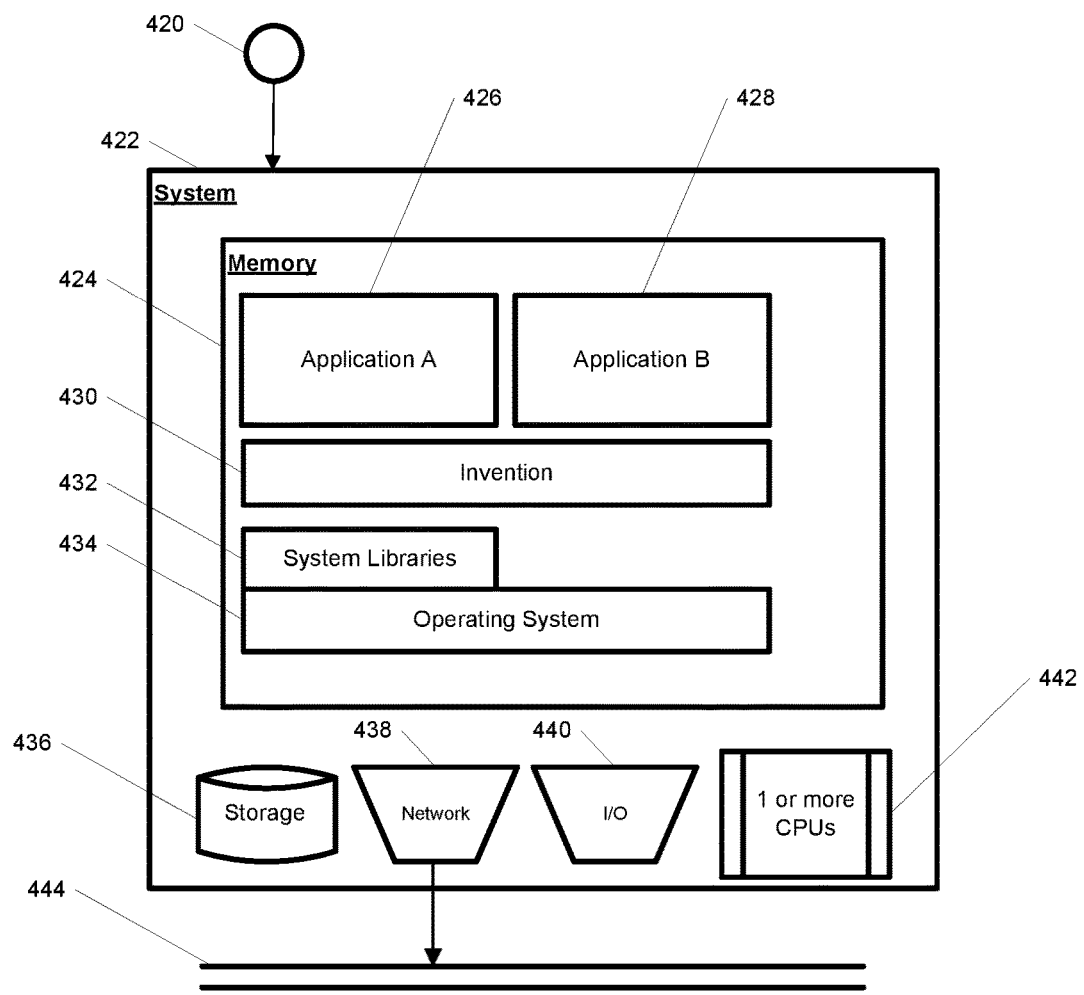
Fig.10 – System Description

METHOD AND COMPUTER READABLE MEDIUM FOR PROVIDING CHECKPOINTING TO WINDOWS APPLICATION GROUPS

CROSS-REFERENCE TO RELATED APPLICATIONS

The present application is a continuation of and claims the benefit of U.S. patent application Ser. No. 14/952,286, filed Nov. 25, 2015, issued U.S. Pat. No. 9,547,561, issued Jan. 17, 2017, which is a continuation of and claims the benefit of U.S. patent application Ser. No. 14/532,336, filed Nov. 4, 2014, issued U.S. Pat. No. 9,201,737, issued Dec. 1, 2015, which is a continuation of U.S. patent application Ser. No. 13/630,282 filed Sep. 28, 2012, issued U.S. Pat. No. 8,881,171, issued Nov. 4, 2014, which is a continuation of U.S. patent application Ser. No. 12/334,666 filed Dec. 15, 2008, issued U.S. Pat. No. 8,281,317 issued Oct. 2, 2012, incorporated by reference in their entirety herein.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains to enterprise computer systems, computer networks, embedded computer systems, wireless devices such as cell phones, computer systems, computers, and more particularly with methods, systems and procedures (i.e., computer readable media, software or programming configured to be read and/or executed by a processor on an electronic device described or depicted herein) for providing high-availability, virtualization and checkpointing services for a computer application(s) running on Microsoft Windows® Operating Systems (herein referred to as Windows or Microsoft Windows).

2. Description of the Related Art

Enterprise and wireless systems operating today are subject to continuous program execution that is 24 hours a day and 7 days a week. There is no longer the concept of "overnight" or "planned downtime". All programs and data must be available at any point during the day and night. Any outages or deteriorated service can result in loss of revenue as customers simply take their business elsewhere, and the enterprise stops to function on a global scale. Traditionally, achieving extremely high degrees of availability has been accomplished with customized applications running on custom hardware, all of which is expensive and proprietary. Traditionally, no mechanisms have existed for protecting Windows applications. The problem is compounded by the fact that Microsoft Windows is a closed operating system without access to source code, so all high availability must be provided external to the operating system.

One reference provides a background for understanding aspects of the current invention. U.S. patent application Ser. No. 11/213,678 filed on Aug. 26, 2005, incorporated in its entirety, which describes how to provide transparent and automatic high availability for applications.

BRIEF SUMMARY OF THE INVENTION

A method, system, apparatus and computer readable medium are described for achieving checkpointing, restoration, virtualization and loss-less migration of Windows applications. The invention provides transparent migration and fail-over of Windows applications while ensuring that connected clients remain unaware of the migration. The client's connection and session are transparently transferred from the primary to the backup server without any client involvement.

The terms "Windows" and "Microsoft Windows" is utilized herein interchangeably to designate any and all versions of the Microsoft Windows operating systems. By example, and not limitation, this includes Windows XP, Windows Server 2003, Windows NT, Windows Vista, Windows Server 2008, Windows Mobile, and Windows Embedded.

The terms "checkpointer", "checkpointing" and "checkpointing service" are utilized herein interchangeably to designate a set of services which 1) capture the entire state of an application and store all or some of the application state locally or remotely, and 2) restore the entire state of the application from said stored application state. The checkpointer may include the following components: user-space dynamic link library—the "checkpoint library", loadable kernel module, coordinator to monitor and coordinate an application group, and a merge utility to merge full and incremental checkpoints. The checkpointing services run (execute) on all nodes where the application groups runs (execute) or can fail over to.

The term "checkpoint file" is utilized herein to describe the data captured by the checkpointing service. Generally, the checkpoint files are written to local disk, remote disk or memory.

The term "node" is utilized herein to designate one or more processors running a single instance of an operating system. A virtual machine, such as VMWare or XEN VM instance, is also considered a "node". Using VM technology, it is possible to have multiple nodes on one physical server.

The terms "application", "independent application", and "windows application" are utilized interchangeably herein to describe a set of one or more processes each with one or more threads that jointly provide a service. Operating systems generally launch an application by creating the application's initial process and letting that initial process run/execute. In the following teachings, we often identify the application at launch time with that initial process and then describe how to handle creation of new processes via the CreateProcess family of functions.

The term "application group" is utilized herein to describe a logical grouping of one or more independent applications that together or independently provide some service. The independent applications do not need to be running at the same time. A member of the application group can also load, perform work and exit, essentially joining and leaving the group.

In the following, we use commonly known terms including but not limited to "process", "process ID (PID)", "thread", "thread ID (TID)", "thread local storage (TLS)", "instruction pointer", "stack", "kernel", "kernel module", "loadable kernel module", "heap", "stack", "disk", "CPU", "CPU registers", "storage", "memory", "memory segments", "memory pages", "address space", "semaphore", "queues", and "signal". These terms are well known in the art and thus will not be described in detail herein.

The terms "APC" and "Asynchronous Procedure Calls" are used herein interchangeably to mean a "function that executes asynchronously in the context of a particular thread". APC is provided as standard functionality on Microsoft operating systems, with documentation available by searching for "APC" on Microsoft's Developers network (msdn.microsoft.com).

The terms "CreateProcess" and "NtCreateProcess" are used to designate the family of Microsoft Windows functions used to create new processes. The terms "TerminateProcess" and "NtTerminateProcess" are used to designate the family of Microsoft Windows functions used to terminate processes. The family of functions is fully documented by Microsoft at msdn.microsoft.com.

In the following, we also use commonly known terms and names of Windows internals, including but not limited to ETHREAD, EPROCESS, Alertable, NtContinue( ), IOCTL (I/O control), IRQL, and APC_LEVEL. These terms are well known in the art and are documented by Microsoft at their developer's support network msdn.microsoft.com.

The term "coordinator" is utilized for designating a special control process running as an element of the invention. The coordinator is generally responsible for sending out coordination events, managing application group registration and for coordinating activities across all application in an application group. For the sake of simplicity, the coordinator is often depicted as running on the same node as the application group; however this is not a requirement as the coordinator can run on any node.

The term "transport" is utilized to designate the connection, mechanism and/or protocols used for communicating across a distributed application. Examples of transport include TCP/IP, Message Passing Interface (MPI), Myrinet, FiberChannel, ATM, shared memory, DMA, RDMA, system busses, and custom backplanes. In the following, the term "transport driver" is utilized to designate the implementation of the transport. By way of example, the transport driver for TCP/IP would be the local TCP/IP stack running on the host.

The terms "shell script" and "shelf" are used to designate the operating system mechanism to run a series of commands and applications. On Windows, shell functionality is provided by "cmd.exe" and .bat files or Windows PowerShell. Examples of cross-platform scripting technologies include JavaScript, Perl, Python, and PHP. Throughout the rest of this document we use the terms "shell" and "shell script" to designate the functionality across all scripting technologies, not just the scripting technologies provided by Microsoft.

The term "interception" is used to designate the mechanism by which an application re-directs a system call or library call to a new implementation. On Windows, interception can be achieved by modifying a process' Import Address Table and creating Trampoline functions, as documented by "Detours: Binary Interception of Win32 Functions" by Galen Hunt and Doug Brubacher, Microsoft Research July 1999".

The term "barrier" and "barrier synchronization" is used herein to designate a type of synchronization method. A Barrier for a group of processes and threads is a point in the execution where all threads and processes must stop before being allowed to proceed. Barriers are typically implemented using semaphores, mutexes, locks, event objects, or other equivalent system functionality. Barriers are well known in the art and will not be described further here.

The term "transparent" is used herein to designate that no modification to the application group's applications are required. In other words, the present invention works directly on the application binary without needing any customization, source code modifications, recompilation, re-linking, special installation, custom agents, or other extensions.

In the following descriptions, the product name "Duration" is utilized in referring to a system as described in the reference cited previously. It should be appreciated, however, that the teachings herein are applicable to other similarly configured systems.

By way of example, consider an e-Commerce service consisting of a WebLogic AppServer and an Oracle Database. In this case WebLogic and Oracle would be the independent applications, and the application group would consist of WebLogic and the Oracle database together.

By way of example, consider a cell phone with an address book and built-in navigation system. In this case the address book and the navigation system would be the independent applications, and the application group would consist of the address book and the navigation application.

By way of example, consider a shell-script running a series of applications and other scripts. In this case the script and all applications and scripts launched by the script comprise the application group, and all the individual applications and other scripts called within the script are the independent applications.

In at least one embodiment, the checkpointer is transparent to an application; no changes to the application are required.

In at least one embodiment, a method of checkpointing single process application groups and multi-process application groups is provided. The method may include creating at least one full checkpoint for each application process in an application group, and may include creating at least one incremental checkpoint for each application process in the application group. Further, the method may automatically merge each of the at least one available incremental application checkpoint against a corresponding full application checkpoint, and synchronize checkpointing across all applications in the application group In at least one embodiment, the checkpointer periodically or on-demand saves an application group's data and computation state to a set of checkpoint files on disk. The contents of an application's checkpoint file may then be loaded at a later point in time into a new instance of the application, restoring the application to its previous state. An application group may be restored on any machine running the same Operating System kernel and system libraries.

In at least one embodiment, the checkpointer may include the following application state in a checkpoint: process & thread attributes, execution context (instruction pointer, stack pointer, CPU registers, etc.), execution state (running, waiting, etc.), process and thread blocks, wait and mutant lists, APC queues, environment blocks, process cookie, user address space, data segments, code segment descriptors, heaps, dynamically allocated segments, file mapped segments, thread stacks, thread local storage (TLS), object, state (open files, mutexes, semaphores, events, etc.), and object handles.

In at least one embodiment, to launch applications protected by the checkpointer, the checkpoint library is first loaded into the application before the application begins running. This is performed transparently, without the need to recompile or re-link the application. The checkpoint library's initialization function is called directly when the library is loaded, instead of going through DllMain( ). DllMain( ) is an optional entry point into a dynamic link library (DLL) that is called every time a thread or process is started or terminated. When a thread is created, including the main thread, the thread's initialization routine locks a mutex before calling DllMain( ). Threads created within DllMain( ) would not be able to start until the main thread exits its DllMain( ) and releases the mutex. As the checkpoint library needs to create its own thread, the checkpoint library is initialized directly, as described above. Once the checkpoint library has been initialized the application process' main thread jumps to the application's entry point, setting the application in motion. Alternatively, if an application is to be restored from a checkpoint the main thread suspends itself and the checkpoint thread initiates the restoration of the process.

In at least one embodiment, when the checkpoint library is loaded it creates a set of objects that are used to record the data and computation state of the process. The checkpoint library's objects are stored in a separate heap to keep its data isolated from the rest of the application. Arguments are passed to the checkpointer through specific environment variables. For example, a restore is triggered by setting a checkpoint file to restore in the ET_CPENV_RESTORE_FILE environment variable. The checkpoint library then registers with the coordinator and kernel module, and creates a separate checkpoint thread. The checkpoint thread is responsible for initiating the process' checkpoint, as well as saving and restoring the state of the process.

In at least one embodiment, to complete the initialization of the checkpointer the checkpoint library installs a set of function interceptors. Function interceptors redirect system library calls to an alternate implementation within the checkpoint library. This allows the checkpointer to perform a number of tasks when an application calls an intercepted function, such as save and/or modify data passed between the application and the kernel, determine when processes, threads, and objects are created, trap synchronization and I/O events, and prevent checkpoints during various system calls. Function interceptors are also used to virtualize elements of an application that cannot be restored to their previous values, such process and thread IDs. Aside from intercepting functions the application may call, the checkpoint library intercepts its process' user exception dispatcher to catch segmentation violations triggered by the process' threads.

In at least one embodiment, the checkpointer's kernel module may perform the following tasks: Signal an application's threads to start a checkpoint, control the flow of execution during a checkpoint and restore, and save and restore a process' kernel attributes and objects.

In at least one embodiment, the kernel module may be loaded and unloaded to/from the kernel dynamically, with no changes to the operating system kernel being necessary. When the kernel module is loaded into the kernel it registers a named device. The checkpoint library is then able to open this device when an application is launched. Commands are sent to the device via I/O control (IOCTL) codes. Upon receiving a registration IOCTL command the kernel module creates a new process entry, creates/updates the application group's barrier, and acquires the process' security cookie—which is used to encrypt function pointers. In another embodiment, the checkpointer kernel module is built in to the operating system kernel.

In at least one embodiment, the barrier allows the application group's threads to execute tasks in lock-step during a checkpoint and restore. The size of the barrier determines the number of threads that are allowed to wait at the barrier. As threads arrive at a barrier they wait, either blocking or non-blocking, for the total number of threads to arrive. The last thread to reach the barrier then releases all the threads waiting at the barrier. A single thread per-process may also be allowed to wait for all other threads in the process to arrive at a specific barrier, without awakening the other threads. This not only allows one thread per-process to be running at any point in time, it also allows one thread to be the only thread running at a specific location within the checkpointer.

In at least one embodiment, the kernel module is responsible for saving and restoring the state of a process' kernel attributes. A process' kernel attributes are accessed through its EPROCESS block. The EPROCESS block is stored in kernel space and is therefore inaccessible from user space. An individual thread's attributes are accessed through its ETHREAD block, also inaccessible from user space. Process and thread blocks cannot be directly restored in memory because kernel-space is shared between all processes. Therefore, on restore a process and thread's kernel attributes are reconstructed by restoring each element individually.

In at least one embodiment, the kernel module is responsible for saving and restoring the state of a process' open kernel objects. Kernel objects are created by user-mode processes indirectly through system calls. The kernel assigns each object a handle that is returned to user-space. User-mode processes then access kernel objects through their user-space handles. For example, if a process calls CreateFile( ) to create a file the kernel creates a file object in kernel space and returns the file's handle back to the process in user space. File operations are then performed by passing the file handle back to the kernel, which access the file object referenced by the handle and operates on the object directly. Like a process' kernel attributes, on restore a kernel object is reconstructed by restoring each attribute individually.

In at least one embodiment, to initiate an application group's checkpoint the coordinator wakes up each application process' checkpoint thread from the checkpoint barrier. Upon awakening, each checkpoint thread sends its process' application-threads a special-kernel APC via the kernel module. Each thread is interrupted at IRQL APC_LEVEL and enters the checkpoint APC handler within the kernel module, whether or not it was executing in user or kernel space. Before being able to save the state of the process each of the application's threads must be in a restorable state. Because the kernel address space of a process cannot be directly restored in memory, a thread cannot be active in kernel space when its state is saved. An "active" thread is utilized herein to mean a thread in a running, ready, or standby state. If a thread is active in kernel space at the time it receives the checkpoint signal a set of hooks are installed to detect when the thread arrives at a restorable state.

When all of the application's threads are in a restorable state they proceed in lock-step throughout the checkpoint. An application's threads are responsible for saving their own state, whereas an application process' checkpoint thread is responsible for saving the state of the process' attributes, objects, and user address space. The coordinator's checkpoint thread simply saves the state of the application group's process table. When an application group's checkpoint is complete each of the applications are resumed.

It should be noted that each of the application's thread are in the kernel module when their state is saved. This does not conflict with the aforementioned algorithm; the checkpointer differentiates between elements of a thread's state that are a result of entering the checkpoint APC and elements that are not.

In at least one embodiment, to restore an application group from a checkpoint the coordinator is passed a checkpoint file to restore instead of an application to start. The coordinator reads the process table contained in the checkpoint and launches each of its child processes and all orphaned processes in the application group. Before launching each process the coordinator sets the path of the process' checkpoint file in an environment variable. Upon loading, the checkpoint library checks for the checkpoint-file environment variable and initializes the checkpoint library for restore if set.

On restore an application re-registers with the coordinator and kernel module. An application then re-launches its child processes and recreates its threads that existed at the time of the checkpoint. When all threads in the application group have been recreated each process restores their state in lock-step. Each process' checkpoint thread is responsible for restoring the process' kernel attributes, objects, and user address space. Unlike a process' kernel-space components, the segments of a process' user address space are restored directly in memory. An application's threads are responsible for restoring their individual state. Once the application group has been restored all applications are resumed.

In at least one embodiment, the checkpointer only saves the elements of a process that change after the previous checkpoint, which can significantly reduce the time to take a checkpoint. A process must first take one full checkpoint, after which all subsequent checkpoints may be taken incrementally. Each incremental checkpoint is merged with the process' previous full checkpoint to produce a new full checkpoint. Merging is performed by a separate merge utility, and may therefore be performed asynchronously. The merge utility is not required to be running on the same node as the application group.

In at least one embodiment, applications may be added to an application group in two ways. The coordinator may launch a user-specified application at any time, or an application may create a new application by calling CreateProcess. CreateProcess creates a new running process with an image specified by the caller. The checkpoint library intercepts CreateProcess to launch the application with checkpointing support. Newly registered applications will be checkpointed and restored along with the rest of the applications in the application group.

In at least one embodiment, applications are removed from an application group upon exit. To determine when an application process exits the checkpoint library intercepts TerminateProcess. Within the TerminateProcess interceptor the checkpointer unregisters the application from the coordinator before allowing the application to exit. The coordinator is then able to determine if a process has exited in a planned or unplanned fashion depending on whether or not it has unregistered by the time it terminates. A user-defined policy governs whether or not an application group should be brought down if one of its processes exits in an unplanned fashion. Nevertheless, the coordinator exits once every application of the group has terminated.

In at least one embodiment, checkpointing services are configured for automatically performing a number of application services, including: injecting registration code into all applications in the application group during launch, registering the group's application as they launch, detecting execution failures, and executing from backup nodes in response to application group failure, application failure or node failure. The services can be integrated transparently into the system in that they are implemented on the system without the need of modifying or recompiling the application program, without the need of a custom loader, or without the need for a custom operating system kernel. In another embodiment, a custom loader is used.

In at least one embodiment, the checkpointing services support shell scripts, where the core shell script application launches new independent applications in any order.

The present invention comprises a set of checkpointing services for application groups. The checkpointing services run on every node where the group application can run. One embodiment of the invention generally functions as an extension of the operating system and runs on all nodes. A coordination mechanism is utilized to ensure that the execution of the independent applications is coordinated at certain points.

By way of example, and not of limitation, the present invention implements checkpointing services for stateless applications (e.g., sendmail), stateful applications (e.g., Voice over IP (VOIP)), multi-tier enterprise applications (e.g., Apache, WebLogic and Oracle Database combined), wireless devices, such as cell phones, pages and PDAs, and large distributed applications, for example those found in High Performance Computing (HPC), such as seismic exploration and financial modeling.

According to one aspect of the invention, the application group runs on a node, with one or more of the independent applications running at any point in time. Each independent application is running independently, but is protected and checkpointed together with all other independent applications in the application group.

According to one aspect of the invention the application group has one or more backup nodes ready to execute the independent application in the place of the original in the event of a fault. The protection of the application group is thus coordinated and guaranteed to be consistent across fault recovery.

An application group can be configured according to the invention with any number of independent applications. Each independent application runs on the primary node while the backup node for the applications stands ready to take over in the event of a fault and subsequent recovery. The primary and backup can be different nodes or the primary and backup can be the same node, in which case the fault recovery is local.

The invention provides layered checkpointing services for application groups, with checkpointing services provided both at the application group level and at the individual independent application level. High availability, including fault detection and recovery, for the individual independent application is provided by Duration's existing stateful High Availability Services. The invention layers a distributed fault detection and recovery mechanism on top of the local fault detection and ensures that fault detection and recovery is consistent across the entire grid.

By way of example, and not of limitation, the invention implements stateless or stateful recovery of application groups by recovering each independent application and ensuring all independent applications are recovered in a consistent state. The recovery is automatic without any application group or independent application involvement.

According to an aspect of the invention, there is a clean separation of the application logic from the checkpointing services code. This allows application programmers to focus on writing their application code, rather than on writing checkpointing code. An administrator can make applications highly available by simply configuring the desired settings, such as by using a graphical configuration tool implemented according to the invention. The result is that high availability applications are developed easily and deployed quickly without the necessity of custom coding.

According to another aspect of the invention, protection is provided against node faults, network faults and process faults. The present invention provides user-controlled system management, automatic availability management, and publish/subscribe event management, including notification of faults and alarms.

In various embodiments of the invention, features are provided that are useful for application groups that must be highly available, including but not limited to the following:

(a) Stateful high availability and checkpointing for application groups, scripts, including high performance computing, financial modeling, enterprise applications, web servers, application servers, databases, Voice Over IP (VOIP), Session Initiation Protocol (SIP), streaming media, Service Oriented Architectures (SOA), wireless devices, such as cell phones, and PDA.

(b) Coordinated Restart and stateful restore for applications groups.

(c) Coordinated and transparent checkpointing of application groups.

(d) Coordinated full and incremental checkpointing for applications groups.

(e) Checkpoints stored on local disks, shared disks, or memories.

(f) Automatic and transparent fault detection for application groups.

(g) Node fault detection.

(h) Process fault detection.

(i) Application group deadlock and hang protection through external health checks.

(j) Coordinated automatic and transparent recovery of applications groups.

(k) Auto-startup of applications groups.

(l) Script support of starting, stopping, or restarting.

(m) Dynamic policy updates.

(n) User-controllable migration of distributed applications.

The invention can be practiced according to various aspects and embodiments, including, but not limited to, those described in the following aspects and embodiments which are described using phraseology which is generally similar to the claim language.

According to an aspect of the invention a method for achieving transparent integration of a application group program with a high-availability protection program comprises: (a) injecting registration code, transparently and automatically, into all independent applications when they launch, without the need of modifying or recompiling the application program and without the need of a custom loader; (b) registering the independent applications automatically with the high-availability protection program; (c) detecting a failure in the execution of the application group or any independent application within the group; and (d) executing the application group with application group being executed from their respective backup servers automatically in response to the failure. The high-availability protection program is preferably configured as an extension of the operating system wherein recovery of application groups can be performed without modifying programming within said application programs. The high-availability protection can be configured for protecting against node faults, network faults, and process faults.

According to another aspect of the invention, a method, system, improvement or computer program is provided for performing loss-less migration of an application group, including loss-less migration of all independent applications from their respective primary nodes to their backup nodes and while being transparent to a client connected to the primary node over a TCP/IP, MPI, system bus or other transport. The transport, i.e. TCP/IP, MPI, or system bus will optionally be flushed and/or halted during checkpointing.

According to another aspect of the invention, a method, system, improvement or computer program performs loss-less migration of an application group, comprising: (a) migrating the independent applications within an application group, without loss, from their respective primary nodes to at least one backup node; (b) maintaining transparency to a client connected to the primary node over a transport connection; (c) optionally flushing and halting the transport connection during the taking of checkpoints; and (d) restoring the application group, including all independent applications, from their checkpoints in response to initiating recovery of the application. The execution transparency to the client is maintained by a high-availability protection program configured to automatically coordinate transparent recovery of distributed applications. Transparency is maintained by a high-availability protection program to said one or more independent applications running on a primary node while at least one backup node stands ready in the event of a fault and subsequent recovery According to another aspect of the invention, a method, system, improvement or computer program performs fault protection for applications distributed across multiple computer nodes, comprising: (a) providing high-availability application services for transparently loading applications, registering applications for protection, detecting faults in applications, and initiating recovery of applications; (b) taking checkpoints of independent applications within applications groups; (c) restoring the independent applications from the checkpoints in response to initiating recovery of one or more the applications; (d) wherein said high-availability application services are provided to the independent applications running on a primary node, while at least one backup node stands ready in the event of a fault and subsequent recovery; and (e) coordinating execution of individual independent applications by a coordinator program which is executed on a node accessible to the multiple computer nodes.

According to another aspect of the invention, a method, system, improvement or computer program performs loss-less migration of an application group, comprising: (a) a high-availability services module configured for execution in conjunction with an operating system upon which at least one application can be executed on one or more computer nodes of a distributed system; and (b) programming within the high-availability services module executable on the computer nodes for loss-less migration of independent applications, (b)(i) checkpointing of all state in the transport connection, (b)(ii) coordinating checkpointing of the state of the transport connection across the application group (b)(iii) restoring all states in the transport connection to the state they were in at the last checkpoint, (b)(iv) coordinating recovery within a restore procedure that is coupled to the transport connection.

According to another aspect of the invention, there is described a method, system, improvement and/or computer program for maintaining all transport connections across a fault. Transport connections will be automatically restored using Duration's virtual IP addressing mechanisms.

Another aspect of the invention is a method, system, improvement and/or computer program that provides a mechanism to ensure that the independent applications are launched in the proper order and with the proper timing constraints during recovery. In one embodiment, a mechanism is also provided to ensure that application programs are recovered in the proper order.

Another aspect of the invention is a method, system, computer program, computer executable program, or improvement wherein user controllable launch of independent applications for the application group is provided.

Another aspect of the invention is a method, system, computer program, computer executable program, or improvement wherein user controllable stop of independent applications and application group is provided.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a block diagram of how the coordinator launches the initial application of an application group.

FIGS. 2A and 2B are block diagrams of how an application process takes a checkpoint.

FIG. 3 is a block diagram of how an application group to restore is launched.

FIGS. 4A and 4B are block diagrams of how an application process is restored from a checkpoint.

FIG. 5 is a block diagram of how a new independent application joins an application group.

FIG. 6 is a block diagram of how a process within an application group launches a new application.

FIG. 7 is a block diagram of how an application group takes full and incremental checkpoints.

FIG. 8 is a block diagram of how an application is removed from its application group.

FIG. 9 is a block diagram illustrating typical deployment scenarios.

FIG. 10 is a block diagram illustrating devices and computers running the invention.

DETAILED DESCRIPTION OF THE INVENTION

Referring more specifically to the drawings, for illustrative purposes the present invention will be described in relation to FIG. 1 through FIG. 10. It will be appreciated that the system and apparatus of the invention may vary as to configuration and as to details of the constituent components, and that the method may vary as to the specific steps and sequence, without departing from the basic concepts as disclosed herein.

1. INTRODUCTION

The context in which this invention is described is a multi-process application group consisting of one or more threads per process. Each application group runs on the primary node and can be supported by one or more designated backup nodes. Without affecting the general case of multiple backups, the following describes scenarios where each application group has one primary node and one backup node. Multiple backups are handled in a similar manner as a single backup. If the backup node is the same as the primary node, all recovery is local.

2. LAUNCHING THE INITIAL APPLICATION OF AN APPLICATION GROUP

FIG. 1 illustrates, by way of example embodiment 10, how the coordinator launches the initial application of an application group. Upon starting, the coordinator 12 determines if an application group is to be started or restored depending on its command line arguments. If a new application group is to be started, the coordinator creates a process table in shared memory to store information about each process of the application group, registers with the kernel module to create the application group barrier, creates a named pipe for applications to register and unregister, and creates a checkpoint thread 14 to initiate an application group checkpoint. The coordinator then proceeds to launch the initial application 16 of the application group.

The coordinator first launches the application process in a suspended state 22. Before allowing the application to run, the coordinator fills a buffer with machine instructions to load the checkpoint library, call the checkpoint library's initialization function, and jump to the application's original entry point. The coordinator inserts the buffer into the address space of the application and changes the application's entry point to begin executing the first instruction contained in the buffer 16. The application is then resumed. Checkpointer information and policies are passed to the application through environment variables, such as the coordinator's PID, logical name of the application group, and directory for storing checkpoints.

Upon starting, the application executes the instructions contained in the inserted buffer to load the checkpoint library 24. The checkpoint library then initializes the checkpointer, which includes registering with the coordinator 18 and kernel module, mapping the application group's process table, creating the checkpoint thread 32, and installing function interceptors. This is all performed before the application has executed any of its own code. Once the checkpointer has been initialized the checkpoint library passes control to the application by instructing the main thread to jump to the application's original entry point 26 and the application proceeds to run.

3. CHECKPOINTING AN APPLICATION PROCESS

There are three components to taking an application checkpoint: the role of the coordinator is described in 3a, the role of an application's checkpoint thread is described in 3b, and the role of the applications' individual threads are described in 3c.

3a. Coordinator's Role During a Checkpoint

FIG. 7 illustrates, by way of example embodiment 280, how the coordinator 298 triggers and coordinates an application group checkpoint. The coordinator's checkpoint thread 282 is responsible for triggering an application group's checkpoint. The checkpoint thread waits 284 until triggered by an elapsed user-defined period or by an external programmatic trigger, as described in the reference above. Upon awakening 286, the checkpoint thread first acquires the application group's checkpoint lock. This prevents the application group from performing actions that are not allowed during a checkpoint, such as launching new processes or creating new threads. The coordinator's checkpoint thread then releases each application's checkpoint thread from the checkpoint barrier to trigger a checkpoint of each application in the group 288.

While each application saves their state, the checkpoint thread saves the group's process table to the coordinator's checkpoint file 290. The process table includes registration information, PID, virtual PID, and binary pathname of each process in the application group. The name of the checkpoint file is a combination of the logical name of the application group, PID, and checkpoint count. The checkpoint thread then waits at the barrier for each process in the application group to complete their checkpoint 292. Once the application group has completed the collective checkpoint the coordinator's checkpoint thread releases all threads in the application group from the final barrier 294, resuming each application of the group. The checkpoint thread then releases the checkpoint lock and goes back to waiting until it is time to take another checkpoint.

During a checkpoint, the coordinator's main thread waits for process registration, un-registration, and join messages 302. However, the checkpoint lock must be acquired before a registration or un-registration message is sent. Since the coordinator's checkpoint thread acquires the checkpoint lock before starting a checkpoint, neither message will be sent during a checkpoint. Likewise, join messages will not be serviced without first acquiring the checkpoint lock. Therefore, join requests sent during a checkpoint are serviced once the application group's collective checkpoint has completed.

The other elements on FIG. 7 are described below.

3b. Application Checkpoint Thread's Role During a Checkpoint

FIG. 2A and FIG. 2B illustrate, by way of example embodiment 40, how an application's checkpoint thread takes a checkpoint. After the coordinator 42 launches an application 44, the application process' checkpoint thread 82 enters the kernel module 84 to wait at the checkpoint barrier 86 before starting a checkpoint. Upon being awoken 88 by the coordinator, the checkpoint thread creates a new checkpoint file in a directory specified by the application group's policy. The checkpoint filename is a combination of the logical name of the application group, process' virtual PID, and checkpoint count. The checkpoint thread then updates the checkpoint barrier to include the total number of threads in the process before signaling 90 each of the application's threads 46 to enter the checkpoint APC/signal handler 48, which is also in kernel space. The terms "signal handler" and "APC signal handler" are utilized herein interchangeably. The checkpoint signal is sent using a special kernel APC. The checkpoint thread then waits at the barrier 92 for each of the application's threads to save their state 68, which is saved to the checkpointer's heap within the user address space of the process.

Once the application's threads have completed saving their state and are suspended at the barrier 70, the checkpoint thread saves the state of the process' kernel attributes and objects to the checkpointer's heap, which are acquired through the process' EPROCESS block. The checkpoint thread then saves the segments of the process' user address space to the checkpoint file 94. The following list describes how the memory segments of a process are saved:

Thread stacks: The size and location of all thread stacks are saved. Only the used portions are saved.

Code segments: Each code segment's size, location, and binary or library pathname are saved.

Data segments: Each data segment's size, location, and contents are saved.

Dynamically allocated segments: Each dynamically allocated segment's size and location are saved. Only a committed region's contents are saved.

Heaps: Each heap's size, location, and handle are saved. Only a committed region's contents are saved.

File-mapped segments: The size, location, and handle of each file-mapped segment are saved. Only a writable region's contents are saved.

After writing the process' memory segments to the checkpoint file, the checkpoint thread closes the process' checkpoint file 96 and waits at the final barrier 98 for the coordinator to release the application group from the checkpoint. Once released, the checkpoint thread goes back to waiting at the checkpoint barrier 86 until it is awoken to take another checkpoint.

3c. Application Thread's Role During a Checkpoint

FIG. 2A and FIG. 2B illustrate, by way of example embodiment 40, how the threads of an application 44, which include the main thread and threads the application creates 45, take a checkpoint. When an application's thread 46 receives the checkpoint signal it enters the checkpoint APC handler 48 in the kernel module at IRQL APC_LEVEL. Executing in kernel-mode allows a thread to directly access its kernel attributes. Once a thread enters the checkpoint APC handler it acquires its ETHREAD block and user-mode context 49. These attributes are used to determine the thread's execution state at the time it received the checkpoint signal. Because the elements of a process must be saved in a controlled manner, all threads sync up together by waiting at the checkpoint barrier. Once every thread has arrived at the barrier they proceed in lock-step throughout the checkpoint.

Before saving the state of the process each of the application's threads first ensure they were interrupted in a restorable state. A thread must not save its state if it was active in kernel space at the time it received the checkpoint signal because its state will not be able to be restored. Unlike a process' private user address space, kernel-space is global and shared by all processes. Therefore, the addresses of a thread's kernel components and kernel stack may not be available on restore. Each thread determines whether or not it was interrupted in a restorable state by examining its execution state at the time of the checkpoint signal. If a thread was either in a wait state 50 or executing in user-space it is already in a restorable state, and proceeds to the next checkpoint barrier. Alternatively, if a thread was active in kernel space 52 at the time it received the checkpoint signal it installs a set of hooks to detect when it either enters a wait state or returns to user space.

To determine if and when a thread executing in kernel space returns to user space, the thread's user-mode instruction pointer is set to an invalid address 54 before returning from the checkpoint signal handler 56. This will generate an exception as soon as the thread returns to user space 58, which in turn will be caught by the checkpoint library's exception dispatcher interceptor 60. The interceptor ensures a checkpoint is in progress and directs the thread to the next checkpoint barrier in the kernel module 65 as the thread has arrived in a restorable state.

To determine if and when a thread executing in kernel space enters a wait state, a user-mode APC is inserted at the front of the thread's APC queue 54 before returning from the checkpoint signal handler 56. This will cause the thread to enter a user-mode APC handler in the checkpoint library 62 if the thread proceeds to wait. The APC handler in turn directs the thread to the next checkpoint barrier in the kernel module 65 as the thread has arrived in a restorable state. Note, for a user-mode APC to trigger, a thread must wait in an "alertable" state. The checkpoint library ensures this is the case by setting the Alertable flag within the interceptors of the wait functions. To prevent a thread from awakening prematurely from a wait state the thread did not intend to be alertable, the checkpoint library intercepts all blocking functions and manages each thread's user-mode APC queue.

Once all threads have arrived at the next checkpoint barrier they reset their user-mode instruction pointer and remove the user-mode APC from their APC queue 66, if still queued. Each thread then proceeds to save its state 68 to the checkpointer's heap by accessing its ETHREAD block. A thread's state includes, but is not limited to, its user-mode context, wait and mutant lists, APC queues, and control block. When each thread finishes saving its state it waits at the final barrier 70 for the coordinator to release the application group from the checkpoint. When released, all the application's threads return from the kernel module 72 to resume where they left off before the checkpoint. Threads caught entering a wait state 74 resume waiting from the checkpoint library's wait interceptors 80, and threads caught exiting the kernel by the exception dispatcher interceptor 76 resume from their valid user-mode context by calling NtContinue( ) 78.

4. RESTORING AN APPLICATION GROUP

FIG. 3 illustrates, by way of example embodiment 100, how an application group to restore is launched. On restore, the coordinator 110 is launched with a checkpoint file to restore set in its command line arguments. The coordinator opens the coordinator's checkpoint file and restores the application group's process table in shared memory, which includes the process hierarchy of the application group. The coordinator launches, as described above, each of its child processes and all orphaned processes in the application group 112. In addition to the steps described in FIG. 1 for launching an application, the coordinator sets the path of a process' checkpoint file to restore in an environment variable before launching each process. Each re-launched process 122 is responsible for launching 124 its own child processes, recreating the application group's process hierarchy.

5. RESTORING AN APPLICATION PROCESS FROM A CHECKPOINT

There are three components to restoring an application from a checkpoint: the role of the coordinator is described in 5a, the role of an application's individual threads are described in 5b, and the role of the application's checkpoint thread is described in 5c.

5a. Coordinator's Role During Process Restore

FIG. 3 illustrates, by way of example embodiment 100, how the coordinator 110 restores an application group. After launching the coordinator's child processes and application group's orphaned processes 112 as previously described, the coordinator's main thread closes the checkpoint file and waits for each process of the application group to re-register 114, including processes launched by their descendants. Registration provides the coordinator with each process' new PID. Each process' original, now virtual, PID is mapped to its new PID within the application group's process table. The coordinator's main thread then goes back to waiting for process registration, un-registration, and join messages 118. Join messages will not be serviced without first acquiring the checkpoint lock, which is owned by the checkpoint thread during restore. Therefore, any join requests sent during the restoration of an application group are not serviced until the application group has been restored.

Upon creation, the coordinator's checkpoint thread 102 re-acquires the checkpoint lock and waits for each application of the group to restore from their checkpoint 104. Once all applications of the group have been restored 126 and their threads have arrived at the final barrier 128, the checkpoint thread releases all threads from the barrier 106, resuming the application group 130. The checkpoint thread then releases the checkpoint lock and goes back to waiting until it is time to take another checkpoint 108.

5b. Application Thread's Role During Restore

FIG. 4A and FIG. 4B illustrate, by way of example embodiment 140, how an application's threads are restored from a checkpoint. After the coordinator 142 launches an application 144, the application's main thread begins within the checkpoint library by checking if a restore file is set in the environment 144. If set, the main thread re-registers with the coordinator 142, sending it the process' new PID, registers with the kernel module, and creates the process' checkpoint thread 166—which in turn recreates the rest of the of application's threads 170. The main thread then enters the kernel module 146 and waits at the barrier for the checkpoint thread to recreate the application's threads 172 that existed at the time of the checkpoint. Once each of the application's threads have been recreated 170, 172 and have entered the kernel module 146, all threads wait at the barrier for the checkpoint thread to restore the process' kernel objects, attributes, and user address space 148. Once released from the barrier the application's threads proceed to restore their state 150.

Each thread's kernel attributes are restored individually. Addresses of objects referenced by a thread's ETHREAD block are changed to reflect their new locations in memory. Various attributes within the ETHREAD block are left alone and must not be changed, such as new thread IDs. Timed waits are also adjusted to coincide with the change in system time and incomplete I/O operations are resumed. All threads then wait at the barrier for the coordinator to release the application group 152. Once released, each thread exits the kernel module 154 and resumes from its user-mode context at the time of the checkpoint. Threads previously in a wait state 156 resume waiting from the wait interceptor 162, and threads caught in the exception dispatcher interceptor during a checkpoint 158 resume from their valid user-mode context by calling NtContinue( ) 160. The restored application 164 proceeds to run until it is time to take another checkpoint.

5c. Application Checkpoint Thread's Role During Restore

FIG. 4A and FIG. 4B illustrate, by way of example embodiment 140, how an application's checkpoint thread restores a checkpoint. When the checkpoint thread starts on restore it opens the checkpoint file set in the environment. The checkpoint thread first restores the checkpointer's heap at its previous location in the process' address space 166. The checkpointer's heap contains information describing the state of the process at the time of the checkpoint, including, but not limited to, process and thread block descriptors, kernel object descriptors, memory segment descriptors, and list of child processes. The checkpoint thread then re-launches the application's child processes using the same method described in FIG. 3 to launch the coordinator's child processes. Once all child processes have been re-launched the checkpoint thread recreates the application's threads that existed at the time of the checkpoint 168. The application's threads are recreated by calling the CreateThread library function. Each thread's stack size and security attributes are initialized to their previous values by setting corresponding arguments to the function call. The thread ID table, also located in the checkpointer's heap, is updated with each new thread ID. The checkpoint thread then enters the kernel module 170 and waits for the application's threads to start and ultimately arrive at the barrier. Once all of the application's threads are suspended at the barrier the checkpoint thread proceeds to restore the process' kernel objects, attributes, and user address space 174.

Kernel objects are recreated and their attributes are restored to their values at the time of the checkpoint 174. ID attributes are updated to reflect any new IDs assigned by the kernel on restore, and object references are updated to reflect their new locations in memory. Each object's handle is virtualized by the checkpointer so the application may continue to use all its previous user-space handles. Next, the process' kernel attributes are restored individually. Addresses of objects referenced by the EPROCESS block are changed to reflect their new locations in memory. Various attributes within the EPROCESS block are left alone and must not be changed, such as new process and thread IDs. The checkpoint thread then proceeds to restore the user address space of the process. The following list describes how the memory segments of a process are restored:

Thread stacks: Thread stacks are restored to their original size and location and their contents are read back into memory.

Code segments: Libraries loaded dynamically are reloaded.

Data segments: Data segments are read back into memory.

Dynamic segments: Dynamic memory segments are restored to their original size and location. Each committed region is mapped back into memory.

Heaps: Heaps are recreated and restored to their original size and location. Each committed region is read back into memory.

File-mapped segments: Segments mapped to files are remapped—after the process' files have been restored.

After restoring the address space of the process the checkpoint thread releases the application's threads from the barrier and waits for their state 176 to be restored. Once all of the application's threads have restored their state and are suspended at the barrier the checkpoint thread completes the restoration of the process by restoring the process' security cookie and reinstalling the checkpoint library's function interceptors 177. The checkpoint thread then closes the checkpoint file 178 and waits for the coordinator to release the application group from the final barrier 180. Once released, the checkpoint thread goes back to waiting at the checkpoint barrier 182 until it is awoken to take another checkpoint.

6. APPLICATION GROUP FULL AND INCREMENTAL CHECKPOINTING

FIG. 7 illustrates, by way of example embodiment 280, how an application group takes full and incremental checkpoints. As described above, the coordinator 298 creates its checkpoint thread 282 and launches the initial application 300. Upon launching 304, the application registers with the coordinator 302 and creates its checkpoint thread before proceeding to run 306. The application's checkpoint thread 308 then waits at the checkpoint barrier 310 for the coordinator's checkpoint thread to initiate a checkpoint. When the coordinator's checkpoint thread wakes up to take a checkpoint it releases the application's checkpoint thread 312 from the checkpoint barrier 288 and the application in turn proceeds to take a checkpoint.

Depending on whether or not the application process has already taken a checkpoint either a full or incremental checkpoint is taken 314. If the process has not yet taken a checkpoint it takes a full checkpoint 316. A full checkpoint contains the full state of the process, as described above. Alternatively, if the process has already taken at least one checkpoint it takes an incremental checkpoint 318. An incremental checkpoint only contains the state of the process that changed after the previous checkpoint—except for thread stacks and checkpointer's heap, which are saved at every checkpoint. A process' kernel-elements are written to the checkpointer's heap during a checkpoint, as described above, and are therefore saved at every checkpoint.

To facilitate taking an incremental checkpoint the checkpoint library maintains a page table to track changes to pages belonging to a process' user address space. The checkpoint library creates a process' page table when an application process is launched and populates it with the initial pages of the process' user address space 304. All pages are initially marked dirty. The page table is updated when pages are modified and when pages are added and removed to/from the process' address space. The addition and removal of pages are detected by intercepting all memory allocation and de-allocation functions before an application is allowed to run 304, including functions that load libraries dynamically. When a new page is allocated the checkpointer adds a corresponding entry in the page table and marks the page dirty. Alternatively, when a page is deallocated the checkpointer removes the corresponding entry from the page table.

To determine when an application's thread writes to a page in the process' user address space, the checkpointer write protects the process' writable user-space pages in memory after every checkpoint. Pages belonging to thread stacks and the checkpointer's heap are not write-protected however; they are saved at every checkpoint. When an application's thread writes to a write-protected page one of two actions occur depending on whether or not the thread is in user or kernel mode at the time. If the thread is in user mode a segmentation violation exception will be raised by the kernel. The checkpoint library catches the segmentation violation with its exception dispatcher interceptor and first verifies the page has been write-protected by the checkpointer. If so, the checkpointer marks the page dirty in the checkpointer's page table, restores the page's permissions, and then re-executes the instruction that triggered the exception. The thread will then proceed to write to the page as it is no longer write-protected.

To handle when an application's thread writes to a write-protected page in kernel mode, via a system call, the checkpoint library intercepts all system call wrappers that pass addresses of user-space buffers as arguments to a system call. If a thread writes to a write-protected page in kernel mode, the kernel will return an error. The checkpointer either handles the error within the system call interceptors, or prevents such errors from ever occurring depending on whether or not a system call may be re-called without changing the application's behavior. If a system call can be re-called without changing the application's behavior the system call's interceptor catches the error returned by the call, verifies the page was write-protected by the checkpointer, marks the page dirty in the checkpointer's page table, restores the page's permissions, and then re-executes the system call. Alternatively, if a system call cannot be re-called without changing the application's behavior, the system call's interceptor restores the permissions of all user-space pages referenced by the system call's arguments before the call is made, marks the pages dirty in the checkpointer's page table, and then executes the system call. The system call will then proceed to write to the user-space pages referenced by the call's arguments as they are no longer write-protected.

When it comes time to take an incremental checkpoint the checkpoint thread 308 saves the process' user-space pages that are marked dirty in the checkpointer's page table 318. Pages belonging to thread stacks and the checkpointer's heap are not write-protected and are therefore saved in full. Once an incremental checkpoint has been written the checkpointer sends the incremental checkpoint and previous full checkpoint files to the merge utility for merging 320. Before allowing the application to be released from the final barrier 324, the checkpoint thread write protects the process' dirty user-space pages in memory and clears the corresponding dirty flags in the checkpointer's page table 322. The checkpoint thread then joins the application's threads at the final barrier 324 and waits for the coordinator to release the application group from the checkpoint.

The merge utility merges an application process' incremental checkpoint with its previous full checkpoint, producing a new full checkpoint. All pages from the incremental checkpoint are copied to the new full checkpoint. A page from the previous full checkpoint is copied to the new full checkpoint if the page exists in the process' address space at the time of the incremental checkpoint, but does not exist in the incremental checkpoint. Merging is performed asynchronously; an application does not need to wait for the merge to complete.

7. ADDING A NEW INDEPENDENT APPLICATION TO AN APPLICATION GROUP

FIG. 5 illustrates, by way of example embodiment 200, how a new independent application is added to an application group. After the coordinator 202 creates an application group by launching an initial application 204 as described above, the coordinator proceeds to wait for application process registration, un-registration, and join messages 208. A join message contains a binary pathname, command line arguments, and environment variables of a new application to launch. A join message may be sent to the coordinator at any time.

Upon receiving a join message 207 the coordinator acquires the checkpoint lock to prevent a checkpoint from occurring while the new application process is being launched. The coordinator launches the application 212 using the same method previously described for launching the initial application in FIG. 1. Once launched, the new application 214 registers 216 with the coordinator. Upon receiving the registration message the coordinator adds a new process entry in the application group's process table 210 and releases the checkpoint lock. The application is now a member of the application group and may proceed to run 218. The coordinator then goes back to waiting for new registration, un-registration, and join requests.

8. ADDING A NEW APPLICATION LAUNCHED BY A PROCESS WITHIN AN APPLICATION GROUP

FIG. 6 illustrates, by way of example embodiment 240, how a new application is launched from a process within an application group. When an application is launched 244 by the coordinator 242 the checkpoint library installs a set of function interceptors 246, including interceptors for CreateProcess, before the application is allowed to run. Once the application starts running 248, calls to CreateProcess are intercepted by the checkpoint library's CreateProcess interceptor 250. Within the interceptor the checkpointer first acquires the checkpoint lock to prevent a checkpoint from occurring while the new application process is being launched. Before launching the new application process, the interceptor preserves data that must be saved from the current process to shared memory using a named file mapping 252. Preserved data includes, but is not limited to, object handle tables—if handles are inherited, checkpointer policies, logical name of the application group, and the PID of the application group's coordinator. The name of the file mapping is set in an environment variable when launching the new application 254. The application is launched 256 using the same method previously described for launching the initial application in FIG. 1. If the application fails to launch an appropriate error code is set. A value indicating success or failure is then returned from the interceptor 258.

On a successful launch 260 the new application's checkpoint library first checks if a named file mapping is set in the environment. If set, the checkpoint library maps the segment and copies its parent's data from shared memory into the process' address space 262. The checkpoint library then proceeds to initialize the checkpointer and register with the coordinator 264 as previously described. Once the application registers with the coordinator 242 the checkpoint lock is released. The application is now a member of the application group and may proceed to run 266.

9. REMOVING AN APPLICATION FROM ITS APPLICATION GROUP

FIG. 8 illustrates, by way of example embodiment 360, how an application 374 is removed from its application group. When an application is launched 364 by the coordinator 362, the checkpoint library intercepts TerminateProcess 376 before the application is allowed to run. Once the application starts running 378, calls to TerminateProcess are intercepted by the checkpoint library's TerminateProcess interceptor 382. Within the interceptor the checkpoint library first acquires the checkpoint lock to prevent a checkpoint from occurring while the application is being removed from the application group. The checkpoint library then unregisters the application from the coordinator 362. Upon receiving a un-registration message 366 the coordinator removes the process' entry from the application group's process table. The application has now been removed from the application group. The checkpoint library then releases the checkpoint lock and calls the real TerminateProcess function, which then terminates the process 384. Once all applications of the group have unregistered 368 the coordinator unregisters from the kernel module 370 and exits 372. If the coordinator detects an application process terminate/crash without having unregistered the coordinator may bring down the application group depending on a user-defined policy.

10. LOSS-LESS MIGRATION OF APPLICATION GROUPS

Referring once again to FIG. 1 for illustrative purposes, the case of migrating an application group from one node to another node is considered. The term "migration" is utilized to mean that the running application group is moved from server to server without first shutting down the application and the restarting the application from scratch on the new node.

Building on the disclosures above, a loss-less migration is achieved by first checkpointing an application group, which includes one or more independent applications, and then restoring the application group on a backup node. The migration is loss-less, which means that no data or processing is lost.

Migration of live applications is preferably activated in the anticipation of faults, such as detecting that a CPU is overheating, or because a server is running out of memory. Migration may also be activated when an administrator wants to re-configure a set of servers, or when servers currently being used have to be freed up.

11. VIRTUALIZATION AND LIVE MIGRATION OF APPLICATION GROUPS

Loss-less migration of application groups can be viewed differently. The ability to checkpoint and migrate entire application groups makes an application location-independent. Application groups can be moved, started and stopped on any server at any point in time. The present teachings therefore show how to de-couple a live running instance of an application from the underlying operating system and hardware. An application's execution has therefore been virtualized, which enables live migration, i.e. migration of a running application, without any application involvement or knowledge thereof.

12. DEPLOYMENT SCENARIOS

FIG. 9 illustrates by way of example embodiment 400 a variety of ways the invention can be configured to operate. In one embodiment, the invention is configured to protect a database 402, in another it is configured protect a pair of application servers 404, 406. In a third embodiment the invention is configured to protect a LAN 408 connected PC 416 together with the application servers 404, 406. In a fourth embodiment the invention is configured to protect applications on a cell phone 414, which is wirelessly connected 412 to the Internet 410 the application servers 404,406 and the database 402. A fifth embodiment has a home-PC 418 connected via the internet 410 to the application servers 404, 406 and the LAN PC 416. The invention runs on one or more of the devices, can be distributed across two or more of these elements, and allows for running the invention on any number of the devices (402,404,406,414, 416,418) at the same time providing either a joint service or any number of independent services.

13. SYSTEM DIAGRAM

FIG. 10 illustrates by way of example embodiment 420 a typical system 422 where the invention, as described previously, can run. The system memory 424 can store the invention 430 as well as any running application 426, 428 being protected. The system libraries 432 and operating system 434 provide the necessary support. Local or remote storage 436 provides persistent storage of and for the invention. The invention is generally loaded from storage 436 into memory 424 as part of normal operation. One or more CPUs 442 performs these functions, and may uses the network devices 438, to access the network 444, and Input/Output devices 440.

14. CONCLUSION

In the embodiments described herein, an example programming environment was described for which an embodiment of programming according to the invention was taught. It should be appreciated that the present invention can be implemented by one of ordinary skill in the art using different program organizations and structures, different data structures, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A non-transitory computer readable medium having computer-executable instructions for execution by a processing system, the computer-executable instructions for:

launching an application group comprised of one or more applications by loading an initial application of said application group and loading one or more of a library and kernel module, initializing said one or more of a library and kernel module and jumping to the entry point of said initial application, wherein each application is comprised of one or more processes and threads;

creating a data structure in a shared storage to store information about each process of said application group; and joining one or more additional applications to said application group by launching said one or more additional applications in a suspended state, initializing said one or more of a library and kernel module for each of said one or more additional applications by sending a join message to said initial application for each of said one or more additional applications, wherein, upon receipt of each of said join messages, said initial application adds information about a joining application to said data structure in shared storage and releases said joining application from said suspended state by jumping to the entry points of said joining application.

2. The non-transitory computer readable medium of claim 1, comprising:

triggering a checkpoint of said application group by triggering a checkpoint of said one or more applications using one or more Asynchronous Procedure Calls (APC);

registering with said one or more of a library or kernel module to create an application synchronization point; and wherein said one or more of a library or kernel module provide checkpointing services for said application group.

3. The non-transitory computer readable medium of claim 1, wherein the initial application is launched in a suspended state.

4. The non-transitory computer readable medium of claim 1, wherein the instructions are further for at least one of:

creating an in-memory buffer, filling said in-memory buffer with computer-executable instructions for loading a checkpoint library, loading a kernel module, calling an initialization function of the checkpoint library, and jumping to an original entry point of the initial application;

wherein said checkpoint library is comprised of one or more of said library and said kernel module.

5. The non-transitory computer readable medium of claim 4, wherein the computer-executable instructions are further for inserting the in-memory buffer into an address space of the initial application and changing the entry point to begin executing a first instruction of the computer-executable instructions.

6. The non-transitory computer readable medium of claim 5, wherein the computer-executable instructions are further for resuming starting of the initial application.

7. The non-transitory computer readable medium of claim 1, wherein the instructions are further for passing at least one of application group checkpoint information and policies to the initial application through the operating system environment.

8. The non-transitory computer readable medium of claim 7, wherein the operating system environment comprise at least one of a process identification (PID) of a coordinator, a logical name of the at least one of the application groups, and a directory for storing checkpoints.

9. A method, comprising:

launching one or more applications each comprising one or more processes and threads;

initializing a checkpointer using one or more of a checkpoint library or checkpoint kernel module;

creating, by said checkpointer, a set of objects that are used to record data and a computation state of application processes and threads;

creating a synchronization point for said one or more applications;

triggering one or more checkpoints of application processes and threads using one or more of user-mode or kernel-mode Asynchronous Procedure Calls (APC) and signaling application threads to enter a checkpoint APC signal handler;

removing, by said checkpoint APC handler, one or more of said user-mode or kernel-mode APCs from the applications' APC queues when at said synchronization point for said one or more applications; and checkpointing one or more joining applications jointly with said one or more applications by launching said one or more joining applications, initializing said one or more of a checkpoint library and kernel module, including said one or more joining applications in said synchronization point for said one or more applications, and including the processes and threads of said joining applications in said triggering of one or more checkpoints.

10. The method of claim 9, wherein launching the one or more applications further comprises at least one of: registering with a coordinator, registering with a kernel module, registering with a checkpoint library, creating a process tables of said one or more applications, creating a checkpoint thread, and installing function interceptors.

11. The method of claim 10, wherein said kernel module is operable to perform at least one of: signaling an application to start a checkpoint, controlling a flow of execution during the checkpoint and a restore, and saving and restoring kernel attributes and objects.

12. The method of claim 10, wherein said kernel module is loaded and unloaded dynamically.

13. The method of claim 9, wherein a user-mode APC is inserted at the front of the application APC queues.

14. A method, comprising:

initializing a checkpointer using one or more of a checkpoint library and a kernel module;

creating a synchronization point for an application comprising one or more processes and threads;

creating a checkpoint thread for said application and triggering checkpointing of said application processes and threads using one or more Asynchronous Procedure Calls (APC), and performing one or more of inserting a user-mode APC at the front of the application's APC queue, and removing said user-mode APC from the application's APC queue when all processes and threads comprising said application have arrived at said synchronization point;

wherein said kernel module is operable to perform at least one of: signaling an application to start a checkpoint, controlling a flow of execution during the checkpoint and a restore, and saving and restoring kernel attributes and objects for said application; and checkpointing one or more joining applications jointly with said application by launching said one or more joining applications, initializing said checkpointer, including said one or more joining applications in said synchronization point for said one or more applications, and including the processes and threads of said joining applications in said triggering of one or more checkpoints.

15. A non-transitory computer readable medium having computer-executable instructions for execution by a processing system, the computer-executable instructions for:
- creating a synchronization point for an application group comprising one or more applications, wherein each of said one or more application comprises one or more processes and threads;
- loading a checkpointer comprised of one or more of a library, a kernel module, and a checkpointer thread;
- triggering a checkpoint of each application in said application group; wherein said triggering of the checkpoint of each application in the application group is performed using one or more Asynchronous Procedure Calls (APC) and performing one or more of inserting a user-mode APC at the front of an application's APC queue, and removing a user-mode APC from the application's APC queue when all processes comprising said application have arrived at said synchronization point; and
- checkpointing one or more joining applications jointly with said applications of said application group by launching said one or more joining applications, including said one or more joining applications in said synchronization point for said one or more applications, and including the processes and threads of said joining applications in said triggering of one or more checkpoints.

16. The non-transitory computer readable medium of claim 15 comprising computer-executable instructions for triggering an application group's checkpoint by at least one of: an elapsed defined period and an external programmatic trigger, wherein the external programmatic trigger is the one or more APC.

17. The non-transitory computer readable medium of claim 15 comprising computer-executable instructions for at least one of:
- saving a state of each application; and
- saving a group process table to a checkpoint file.

18. The non-transitory computer readable medium of claim 17, wherein the group process table includes at least one of: registration information; a process identification; a virtual process identification; and a path name of each process in the application group.

19. The non-transitory computer readable medium of claim 15 comprising computer-executable instructions for at least one of:
- releasing the application checkpoint thread from the synchronization point to trigger the checkpoint of each application in the application group;
- waiting at a synchronization point for each process in the application group to complete a respective checkpoint; and
- releasing all threads in the application group from a final synchronization point.

20. The non-transitory computer readable medium of claim 19 comprising computer-executable instructions for at least one of:
- resuming each application of the application group; and
- releasing the checkpoint lock.

* * * * *